(12) United States Patent
Chitnis

(10) Patent No.: US 11,113,177 B1
(45) Date of Patent: Sep. 7, 2021

(54) SECURELY DEBUGGING DIFFERENT APPLICATIONS IN A SINGLE SHORT-LIVED CONTAINER

(71) Applicant: TRACELINK, INC., North Reading, MA (US)

(72) Inventor: Satish Chitnis, Lexington, MA (US)

(73) Assignee: TRACELINK, INC., North Reading, MA (US)

( * ) Notice: Subject to any disclaimer, the term of this patent is extended or adjusted under 35 U.S.C. 154(b) by 0 days.

(21) Appl. No.: 16/937,450

(22) Filed: Jul. 23, 2020

(51) Int. Cl.
*G06F 11/36* (2006.01)
*H04L 29/08* (2006.01)

(52) U.S. Cl.
CPC ...... *G06F 11/3628* (2013.01); *G06F 11/3632* (2013.01); *G06F 11/3656* (2013.01); *H04L 67/28* (2013.01)

(58) Field of Classification Search
None
See application file for complete search history.

(56) References Cited

U.S. PATENT DOCUMENTS

| | | | | |
|---|---|---|---|---|
| 2017/0262355 A1* | 9/2017 | Liu | ...................... | G06F 11/3636 |
| 2017/0286268 A1* | 10/2017 | Lincoln | ................. | G06F 11/366 |
| 2017/0315795 A1* | 11/2017 | Keller | ................. | G06F 11/3409 |
| 2017/0315901 A1* | 11/2017 | Wang | ................... | G06F 11/3664 |
| 2018/0011775 A1* | 1/2018 | Baines | ................. | G06F 11/362 |
| 2018/0198824 A1* | 7/2018 | Pulapaka | ................ | G06F 9/455 |
| 2018/0336113 A1* | 11/2018 | Asawa | ................ | G06F 11/3409 |
| 2020/0274718 A1* | 8/2020 | Hwang | ................. | H04L 9/0643 |

* cited by examiner

*Primary Examiner* — Philip Wang
(74) *Attorney, Agent, or Firm* — Steven M. Greenberg, Esq.; Shutts & Bowen LLP

(57) ABSTRACT

A data processing system adapted for securely debugging multiple different application instances in a single short-lived container includes a host computing platform having one or more computers, each with memory and at least one processor. The system also includes a container manager executing in the host computing platform, such that during execution, the container manager manages a multiplicity of different containers of a containerized environment. Finally, the system includes a debug server containerized within one of the containers. The debug server authenticates with the container manager for the one of the containers and establishes a communicative link over a computer communications network with a debug client disposed externally to the containerized environment, so that the debug server then proxies debug directives received from the debug client to selected ones of different application instances each executing within the one of the containers.

9 Claims, 2 Drawing Sheets

SECURELY DEBUGGING DIFFERENT APPLICATIONS IN A SINGLE SHORT-LIVED CONTAINER

BACKGROUND OF THE INVENTION

Field of the Invention

The present invention relates to the field of virtualization and more particularly to the debugging of an application that has been deployed into a short-lived containerized computing environment.

Description of the Related Art

Conventionally, computer programs execute within an operating system environment on the bare metal of a computer with the operating system processing the program instructions of the computer program and providing moderated access to the resources of the computer. In the modern era of computing, however, the execution of multiple different programs within the same computer has become an essential requirement. To that end, virtualization is a technology that permits the execution of different computer program instances in different isolated virtual machines, known as "guests" and managed by a supervising process, known as a "hypervisor". Each virtual machine is isolated from each other virtual machine such that each instance of a computer program executing within a corresponding virtual machine remains completely isolated from other instances of the same program or other programs.

The use of virtualization, however, is not without consequence. Each virtual machine, as a guest operating system, must in of itself, support the operation of an operating system able to host the execution of a corresponding computer program instance. As will be understood, multiple different operating systems executing within corresponding virtual machines in a single computing system can consume substantial resources of the computing system thus affecting the performance of all host applications in their respective virtual machines.

To address the excess resource consumption of virtualization, containerization oftentimes is employed as a suitable substitute—especially where multiple instances of a single computer program are to be deployed within the same host computing system. Unlike virtualization, in containerization, no separate operating system is deployed in each container. Thus, containerization demands less resource consumption and thus higher operational performance for all instance of a computer program executing in a containerized host computing system.

Customarily, the traditional deployment of a containerized computing environment includes the placement different applications in separate short-lived, ephemeral containers, so as to provide "containerized" or "dockerized" microservices. Each short-lived, ephemeral container, then, enjoys its own access to computing resources of the underlying computing platform. As such, access to any containerized program logic within the container must authenticate for access to the underlying computing resources. To the extent that a single application instance is deployed into a container, so much is not burdensome including when debugging the application instance within the container during development and testing. But, once multiple different containerized application instances execute within the same short-lived container, debugging each requires separate authentication—a burdensome exercise from within a debugging environment.

BRIEF SUMMARY OF THE INVENTION

Embodiments of the present invention address deficiencies of the art in respect to debugging short-lived containers in a containerized environment and provide a novel and non-obvious method, system and computer program product for securely debugging multiple different application instances in a single short-lived container. In an embodiment of the invention, a method for securely debugging multiple different application instances in a single short-lived container includes containerizing a multiplicity of different application instances into a single short-lived container in a containerized environment, and additionally containerizing a debug server in the single short-lived container and authenticating the debug server within the containerized environment. The method further includes establishing a communicative link between the debug server and a debug client executing remotely from the single short-lived container. Finally, the method includes proxying debug directives from the debug client through the debug server to selected ones of the different application instances.

In one aspect of the embodiment, the method additionally includes identifying for the debug client, a set of the different application instances that are permitted to be debugged by an end user associated with the debug client and performing the proxying of the debug directives from the debug client through the debug server only to those of the different application instances in the set. In another aspect of the embodiment, the method additionally includes authenticating an end user of the debug client externally to the containerized environment and permitting the proxying only upon authentication of the end user of the debug client, and without further need for the end user of the debug client to authenticate within the containerized environment.

In yet another aspect of the embodiment, the method additionally includes responding to the authentication of the end user of the debug client externally to the containerized environment by identifying a set of the different application instances that are permitted to be debugged by the end user by comparing a deployment name provided by the end user to a table of deployed application instances associated with an organization of the end user, generating a configuration file specifying the set and transmitting the configuration file to the debug server for use by the debug server in limiting the proxying of the debug directives on behalf of the end user only in respect to the application instances specified in the set in the configuration file. In this regard, optionally, the set may be defined according to an organization associated with the end user so as to limit debugging access by the end user to ones of the application instances associated with the organization while excluding access by the end user to others of the applications instances associated with other organizations.

In another embodiment of the invention, a data processing system is adapted for securely debugging multiple different application instances in a single short-lived container. The system includes a host computing platform having one or more computers, each with memory and at least one processor. The system also includes a container manager executing in the host computing platform, such that during execution, the container manager manages a multiplicity of different containers of a containerized environment. Finally, the system includes a debug server containerized within one of the containers. The debug server authenticates with the container manager for the one of the containers and establishes a communicative link over a computer communications network with a debug client disposed externally to the containerized environment, so that the debug server then proxies debug directives received from the debug client to selected ones of different application instances each executing within the one of the containers.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the secure debugging of multiple different application instances in a single short-lived container within a containerized environment. In accordance with an embodiment of the invention, a debug server is containerized within a short-lived container of a containerized environment along with a multiplicity of different application instances. A communicative connection is then established between the debug server within the container and a debug client executing externally from the short-lived container. The debug server authenticates with the containerized environment while an end user authenticates not with the containerized environment, but with the debug client. Thereafter, debug operations by the end user are received in the debug server from the debug client directed to selected ones of the application instances, and the debug server applies the debug operations to the selected ones of the applications on behalf of the end user without requiring the end user to authenticate with the containerized environment.

Figure 1:
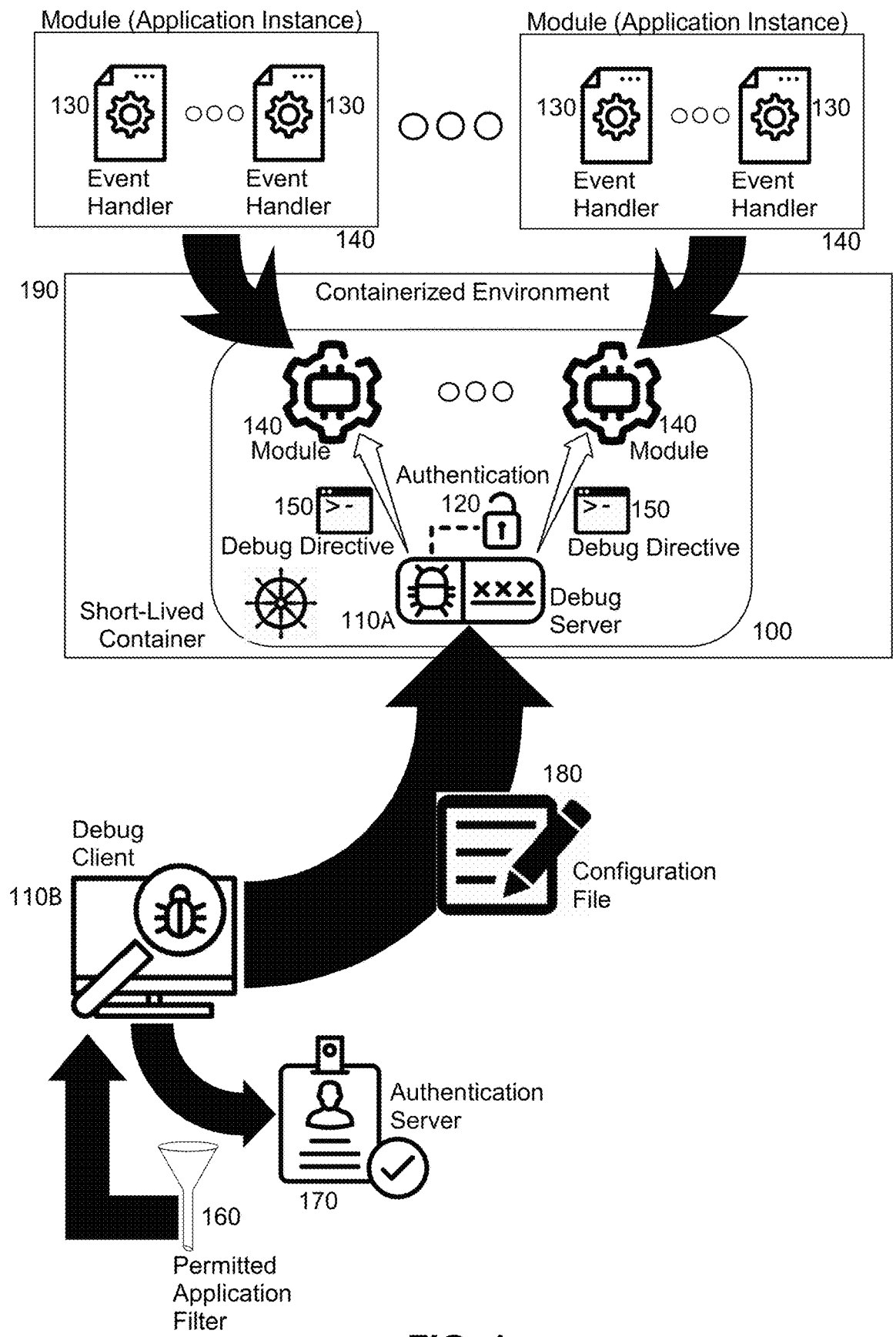
FIG. 1 is pictorial illustration of a process for securely debugging multiple different application instances in a single short-lived container.

In further illustration, FIG. 1 pictorially shows a process for securely debugging multiple different application instances in a single short-lived container. As shown in FIG. 1, a short-lived container 100 is defined, configured and rendered operable within a containerized environment 190. Different modules 140 are then containerized within the short-lived container 100. In this regard, each of the different modules 140 may refer to a different instance of a same or a different application. As well, each of the modules 140 may include a multiplicity of different event handlers 130, each of the event handlers 130 having programming operable to handle an event received in the short-lived container 100 as part of the functionality of a corresponding application instance.

Each of the modules 140 may be debugged in situ within the short-lived container 100. In this regard, a debug server 110A may also be containerized within the short-lived container 100. The debug server 110A is operable to receive debug directives 150 from a debug client 110B executing externally from the short-lived container 100, each of the debug directives 150 specifying a particular one of the modules 140 containerized within the short-lived container 100. To that end, the debug server 110A may authenticate with the short-lived container 100 by way of an authentication service 120 provided by the containerized environment 190. Thereafter, acting as a proxy for the debug client 110B, the debug server 110A may apply the debug directives 150 received from an external end user operating the debug client 110B to specified ones of the modules 140 without requiring the repeated authentication of the end user.

Of note, despite the avoidance of the end user authenticating with the containerized environment 190, the end user still may authenticate with the debug client 110B. More specifically, when initiating a debug session with the debug client 110B, the debug client 110B provides credentials to an authentication server 170 as well as a selection of one or more of the modules 140 in order to authenticate the permissibility of the end user to access selected ones of the modules 140 in the short-lived container 100. The debug client 110B in turn generates a configuration file 180 including the selection of the set of permitted modules 160 and transmits the configuration file 180 to the debug server 110A in the short-lived container 100. The debug server 110A then may selectively permit the application of debug directives 150 on behalf of the end user only when permitted by the permissions of the configuration file 180.

Figure 2:
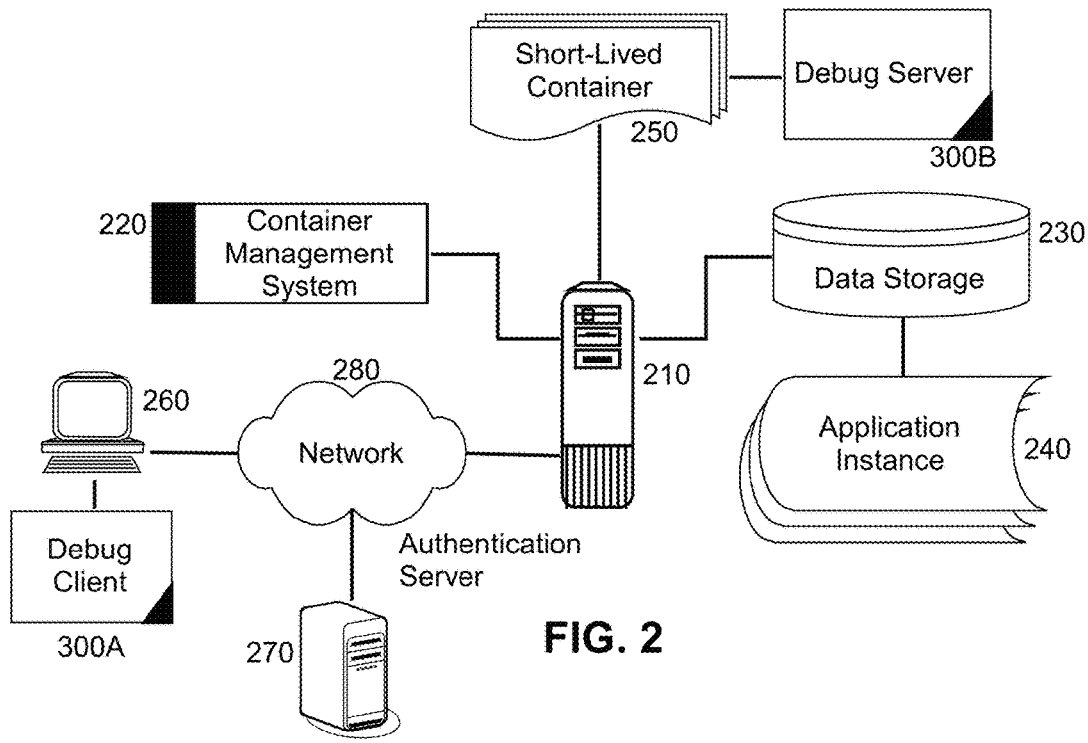
FIG. 2 is a schematic illustration of a data processing system configured for securely debugging multiple different application instances in a single short-lived container; and, FIG. 3 is a flow chart illustrating a process for securely debugging multiple different application instances in a single short-lived container.

The process described in connection with FIG. 1 may be implemented within a data processing system that supports a containerized environment. In more specific illustration, FIG. 2 schematically shows a data processing system configured for securely debugging multiple different application instances in a single short-lived container. The system includes a host computing platform 210 that includes one or more computers, each with memory and at least one processor. A container management system 220 executes within the memory of the host computing platform 210 and is adapted to support the co-execution of multiple different short-lived containers 250 also within the memory of the host computing platform 210. Within each of the short-lived containers 250, different ones of application instances 240 stored within fixed storage 230 may be containerized and therefore deployed for operation.

The system yet further includes a debug server 300B disposed within a corresponding one of the short-lived containers 250. The debug server 300B is communicatively coupled over a computer communications network 280 to a debug client 300A executing in the memory of a client computer 260. The debug server 300B includes computer program instructions that when executing in the corresponding one of the short-lived containers 250, is operable to authenticate with the container managements system 220 for the corresponding one of the short-lived containers 250, to receive on behalf of an end user through the debug client 300A, a request to apply a debug directive to a module of one of the application instances 240 also containerized within the corresponding one of the short-lived containers 250 and to respond to the request by applying the debug directive to the module without further requiring the end user to authenticate with the container management system 220.

Optionally, the debug client 300A includes program instructions operable during execution in the client computer 260 to authenticate the end user with a remote authentication server 270 from over the computer communications network 280. Responsive to the authentication of the end user, the debug client 300A assembles a list of particular modules of corresponding ones of the applications instances 240 to which the end user is permitted to apply debug directives. The program instructions of the debug client 300A is further enabled to package the list of the particular modules in a configuration file (not shown) and provide the configuration file over the computer communications network 300A to the debug server 300B for use by the debug server 300B in determining whether or not to permit the application of a debug directive by the end user to a particular one of the modules containerized within the corresponding one of the short-lived containers 250 along with the debug server 300B.

Figure 3:
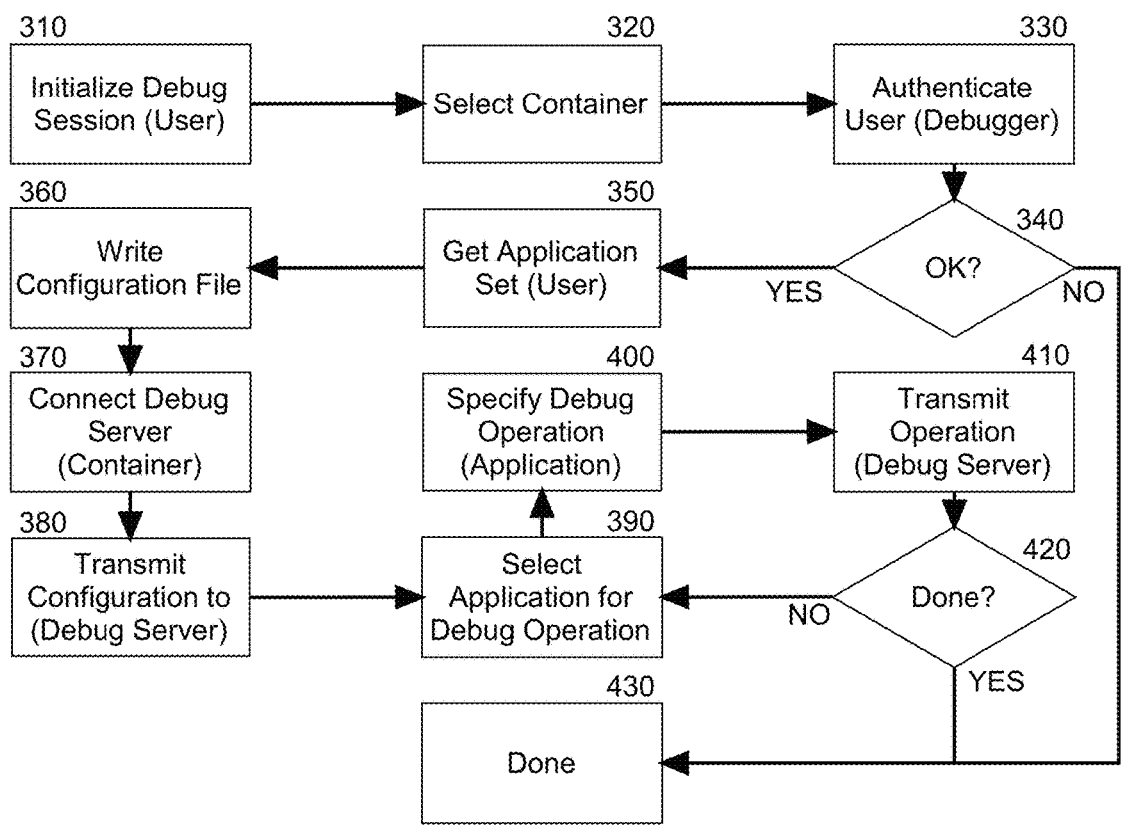

In even further illustration of the operation of the debug client 300A, FIG. 3 is a flow chart illustrating a process for securely debugging multiple different application instances in a single short-lived container. Beginning in block 310, a debug session is initialized on behalf of the end user. Then, in block 320 a specific short-lived container in the containerized environment is selected and in block 330, the end user is authenticated by the debug client. In decision block 340, if it is determined that the end user has successfully authenticated, in block 350 a set of application instances permitted to be accessed by the end user is determined and in block 360, a configuration file is generated including the set of application instances (or modules thereof).

In block 370, the debug client establishes a communicative connection with a debug server containerized within the selected short-lived container and in block 380, the configuration file is transmitted to the debug server. Thereafter, in block 390, a module of an application instance is selected for debugging and in block 400, a debug operation is specified for application to the selected module. Exemplary debug operations include the establishment of a watch on a variable value, inspection of a variable value, the establishment of a breakpoint, and the stepping of a code execution trace, to name only a few examples. In block 410, the specified debug operation is transmitted from the debug client to the debug server. Finally, in decision block 420, if additional debug operations are to be specified, the process returns to block 390, but when no further debug operations are to be specified, the process ends in block 430.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "include", "includes", and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for securely debugging multiple different application instances in a single short-lived container, the method comprising:
    containerizing a multiplicity of different application instances into a single short-lived container in a containerized environment;
    additionally containerizing a debug server in the single short-lived container and authenticating the debug server within the containerized environment;
    establishing a communicative link between the debug server and a debug client executing remotely from the single short-lived container;
    proxying debug directives from the debug client through the debug server to selected ones of the different application instances;
    authenticating an end user of the debug client externally to the containerized environment and permitting the proxying only upon authentication of the end user of the debug client, and without further need for the end user of the debug client to authenticate within the containerized environment; and,
        responding to the authentication of the end user of the debug client externally to the containerized environment, by:
            identifying a set of the different application instances that are permitted to be debugged by the end user,
            generating a configuration file specifying the set, and transmitting the configuration file to the debug server for use by the debug server in limiting the proxying of the debug directives on behalf of the end user only in respect to the application instances specified in the set in the configuration file.

2. The method of claim 1, further comprising:
    identifying for the debug client, a set of the different application instances that are permitted to be debugged by an end user associated with the debug client; and, performing the proxying of the debug directives from the debug client through the debug server only to those of the different application instances in the set.

3. The method of claim 1, wherein the set is defined according to an organization associated with the end user so as to limit debugging access by the end user to ones of the application instances associated with the organization while excluding access by the end user to others of the applications instances associated with other organizations.

4. A data processing system adapted for secure debugging different application instances in a single short-lived container, the system comprising:
    a host computing platform comprising one or more computers, each comprising memory and at least one processor;
    a container manager executing in the host computing platform and during execution managing a multiplicity of different containers of a containerized environment; and,
    a debug server containerized within one of the containers, the debug server authenticating with the container manager for the one of the containers and establishing a communicative link over a computer communications network with a debug client disposed externally to the containerized environment, the debug server proxying debug directives received from the debug client to selected ones of different application instances each executing within the one of the containers,
    the debug client authenticating an end user of the debug client externally to the containerized environment and permitting the proxying only upon authentication of the end user of the debug client, and without further need for the end user of the debug client to authenticate within the containerized environment, and responding to the authentication of the end user of the debug client externally to the containerized environment, by:
        identifying a set of the different application instances that are permitted to be debugged by the end user,
        generating a configuration file specifying the set, and transmitting the configuration file to the debug server for use by the debug server in limiting the proxying of the debug directives on behalf of the end user only in respect to the application instances specified in the set in the configuration file.

5. The system of claim 4, wherein the debug server further identifies for the debug client, a set of the different application instances that are permitted to be debugged by an end user associated with the debug client, and then proxies the debug directives from the debug client only to those of the different application instances in the set.

6. The system of claim 5, wherein the set is defined according to an organization associated with the end user so as to limit debugging access by the end user to ones of the application instances associated with the organization while excluding access by the end user to others of the applications instances associated with other organizations.

7. A computer program product for securely debugging multiple different application instances in a single short-lived container, the computer program product including a non-transitory computer readable storage medium having program instructions embodied therewith, the program instructions executable by a device to cause the device to perform a method including:
    containerizing a multiplicity of different application instances into a single short-lived container in a containerized environment;

additionally containerizing a debug server in the single short-lived container and authenticating the debug server within the containerized environment;

establishing a communicative link between the debug server and a debug client executing remotely from the single short-lived container;

proxying debug directives from the debug client through the debug server to selected ones of the different application instances;

authenticating an end user of the debug client externally to the containerized environment and permitting the proxying only upon authentication of the end user of the debug client, and without further need for the end user of the debug client to authenticate within the containerized environment; and, responding to the authentication of the end user of the debug client externally to the containerized environment, by:

identifying a set of the different application instances that are permitted to be debugged by the end user, generating a configuration file specifying the set, and transmitting the configuration file to the debug server for use by the debug server in limiting the proxying of the debug directives on behalf of the end user only in respect to the application instances specified in the set in the configuration file.

8. The computer program product of claim 7, wherein the method further includes:

identifying for the debug client, a set of the different application instances that are permitted to be debugged by an end user associated with the debug client; and, performing the proxying of the debug directives from the debug client through the debug server only to those of the different application instances in the set.

9. The computer program product of claim 7, wherein the set is defined according to an organization associated with the end user so as to limit debugging access by the end user to ones of the application instances associated with the organization while excluding access by the end user to others of the applications instances associated with other organizations.

* * * * *